United States Patent
Po-Chang

Patent Number: 6,035,874
Date of Patent: Mar. 14, 2000

[54] MULTIPURPOSE RECREATIONAL SHADE FOR USE IN CONJUNCTION WITH MOTOR VEHICLE

[76] Inventor: Chang Po-Chang, No. 149, Feng-Shi Street, Feng-Yuan City, Taichung, Taiwan

[21] Appl. No.: 09/253,835

[22] Filed: Feb. 19, 1999

[51] Int. Cl.[7] .............................. E04H 15/06; E04H 15/50
[52] U.S. Cl. .................................... 135/88.06; 135/88.05; 135/131; 135/145; 296/163
[58] Field of Search .............................. 135/88.06, 88.05, 135/88.09, 145, 131; 52/109; 296/163

[56] References Cited

U.S. PATENT DOCUMENTS

| | | |
|---|---|---|
| 1,257,535 | 2/1918 | Sampson . |
| 1,712,836 | 5/1929 | Mills . |
| 2,054,673 | 9/1936 | Hastings . |
| 4,601,301 | 7/1986 | Hermanson . |
| 4,655,236 | 4/1987 | Dorame et al. ....................... 135/88.06 |
| 4,900,081 | 2/1990 | Lee . |

*Primary Examiner*—Robert Canfield
*Attorney, Agent, or Firm*—W. Wayne Liauh

[57] ABSTRACT

A multipurpose recreational shade is designed for use in conjunction with a motor vehicle and is composed of two clamping frames each having an upright post to which a suspension arm is fastened, and of a canvas which is folded and unfolded by the two suspension arms of the two clamping frames. The two clamping frames are detachably secured to the fin plates located over the front wheel and the rear wheel of the same side of the body of the motor vehicle. The multipurpose recreational shade can be used for picnic or other outdoor activities, and the protection of the motor vehicle against the solar radiation.

10 Claims, 11 Drawing Sheets

Fig. 10

MULTIPURPOSE RECREATIONAL SHADE FOR USE IN CONJUNCTION WITH MOTOR VEHICLE

FIELD OF THE INVENTION

The present invention relates generally to a recreational shade used for protection against the solar radiation, and more particularly to a multipurpose recreational shade which is used in conjunction with a motor vehicle and can be also used to protect the motor vehicle from the solar radiation.

BACKGROUND OF THE INVENTION

Figure 1:
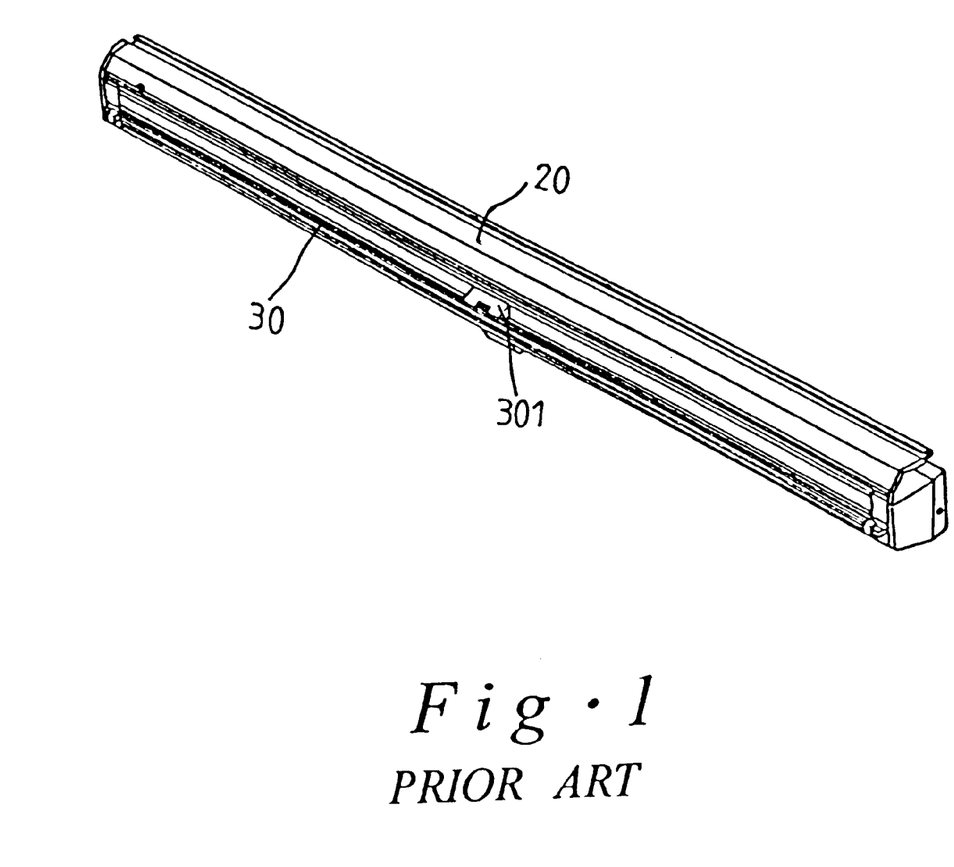
FIG. 1 shows a schematic view of a folded shade of the prior art.
Figure 2:
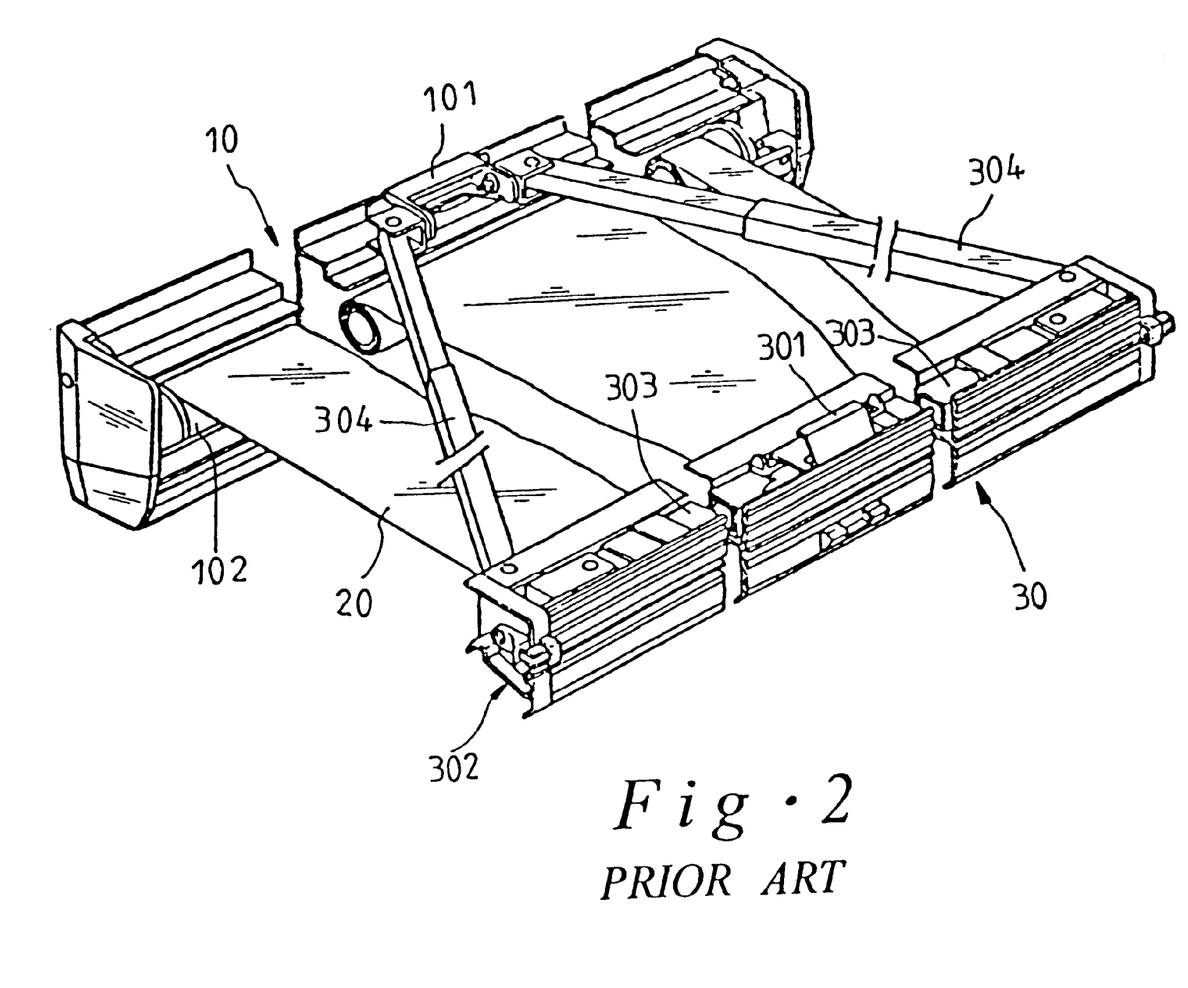
FIG. 2 shows a schematic view of an unfolded shade of the prior art.
Figure 3:
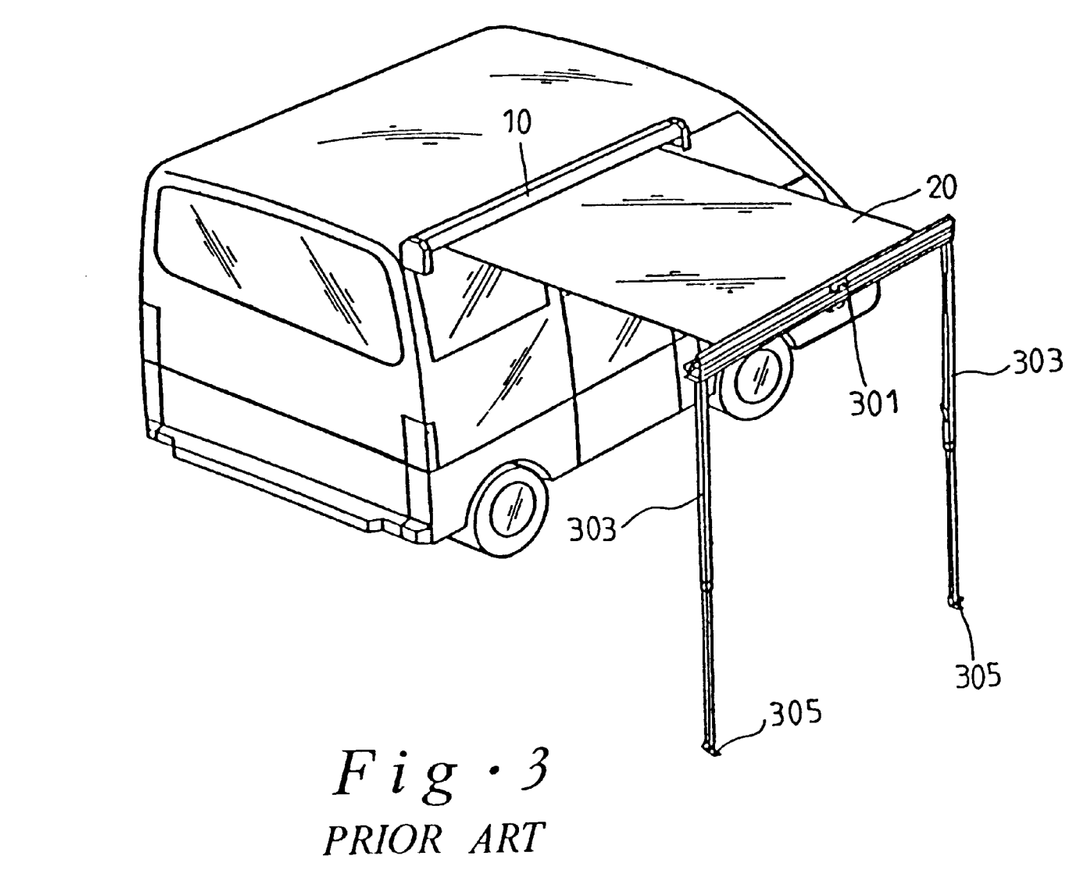
FIG. 3 shows a schematic view of the prior art shade at work in conjunction with a motor vehicle.

As shown in FIGS. 1–3, a recreational shape of the prior art is used in conjunction with a car and is composed of a fastening frame 10, a canvas 20 that can be extracted from and retracted into the fastening frame 10, and a foldable support frame 30 that can be folded to join with the fastening frame 10. The foldable support frame 30 is provided at the midpoint thereof with a pull handle 301, and at both longitudinal ends thereof with a retaining device 302 for retaining the foldable support frame 30 at the time when the foldable support frame 30 is joined with the fastening frame 10. The support frame 30 is also provided with two bracing frames 303 and two expandable frames 304. The two bracing frames 303 are provided respectively with a leg seat 305 for supporting the canvas 20 which is extracted from the fastening frame 10. The two expandable frames 304 are connected at one end thereof with the foldable support frame 30, and at other end thereof with a fastening seat 101 located at the midpoint of the fastening frame 10. As a result, the two expandable frames 304 of the support frame 30 form a V-shaped support frame located under the canvas 20. The fastening frame 10 has a hollow interior which is provided with an elastic winding shaft 102 for retracting the canvas 20 into the fastening frame 10. Now referring to FIG. 3 in which the recreational shade of the prior art is shown being used in conjunction with an automobile such that the fastening frame 10 is secured to the body of the automobile, and that the canvas 20 is extracted from the fastening frame 10 by means of the pull handle 301 of the foldable support frame 30, and further that the extracted canvas 20 is supported by the V-shaped support frame formed of two expandable frames 304 of the support frame 30. The extracted canvas 20 is further supported by the two bracing frames 303, with the leg seats 305 of the two bracing frames 303 making contact with the ground surface.

Such a prior art recreational shade as described above is defective in design in that it can not be converted for use as a shade to protect the automobile from the solar radiation at the time when the automobile is parked in an open field, and that it can not be used in conjunction with motor vehicles of all types or models, and further that the body of the automobile must be equipped with a device compatible with the fastening. frame 10 of the prior art recreational shade, and further that the prior art recreation shade is fixedly fastened with the body of the automobile, thereby undermining the aesthetic effect of the body of the automobile as well as being the source of a safety hazard.

SUMMARY OF THE INVENTION

It is therefore the primary objective of the present invention to provide a multipurpose recreational shade.

It is another objective of the present invention to provide a recreational shade which is free from the drawbacks of the prior art recreational shade described above.

In keeping with the principle of the present invention, the foregoing objectives of the present invention are attained by a multipurpose recreational shade which is designed for use in conjunction with a motor vehicle and is composed of two clamping frames each having an upright post to which a suspension arm is fastened, and of a canvas which is unfolded by two suspension arms of the two clamping frames. The two clamping frames are detachably secured to the fin plates located over the front wheel and the rear wheel of the same side of the body of the motor vehicle. The multipurpose recreational shade can be thus used for the recreational purpose and the protection of the motor vehicle against the solar rays.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 4:
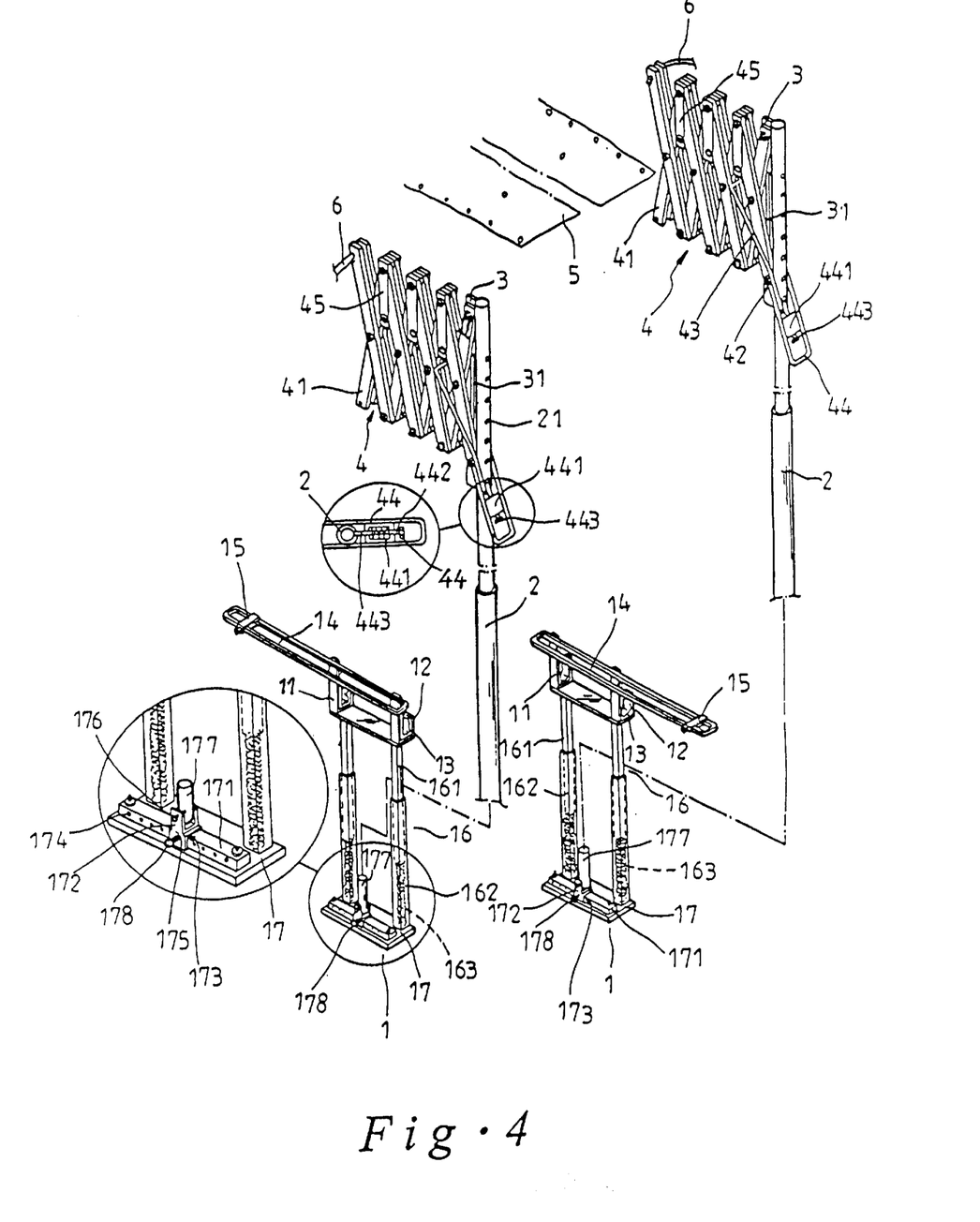
FIG. 4 shows an exploded view of the preferred embodiment of the present invention.

As shown in FIG. 4, a multipurpose recreational shade embodied in the present invention is composed of two clamping frames 1, two upright posts 2, two locating plates 3, two suspension arms 4, and a canvas 5.

The clamping frames 1 have a clamping seat 12 which is provided respectively at two sides thereof with an arresting wall 11, and in the inner side thereof with a protective pad 13. The arresting wall 11 is provided with a slide slot 14 which is in turn provided thereon with an arresting seat 15 slidable on the slide slot 14. The clamping seat 12 is provided in the underside thereof with an expandable tube 16 having an inner tube 161. Located between the bottom ends of the inner tube 161 and the outer tube 162 is a spring 163. The outer tube 162 is fastened at the bottom end thereof with a bottom seat 17. The spring 163 is confined by the bottom end of the inner tube 161 and the bottom seat 17. The bottom seat 17 is provided with a slide block 171 fastened therewith. A slide seat 172 is provided with a slide rail 173 traversing the slide block 171. The slide block 171 of the bottom seat 17 is provided with a plurality of adjustment holes 174. A fastening bolt 18 is put through the locating hole 175 to urge the adjustment holes 174. The slide seat 172 of the bottom seat 17 is pivoted with a movable sleeve 177 by a pivot 176.

The upright posts 2 are expandable and provided with a plurality of locating holes 21.

The locating plates 3 are fastened respectively with the top end of the upright posts 2. The locating plates 3 are respectively provided with a long hole 31.

The suspension arms 4 are composed of a plurality of rod bodies 41 which are fastened pivotally together to work as a crank mechanism. The suspension arms 4 are fastened at one end thereof with the locating plates 3, and at other end thereof with a bolt 42 which is received in the long hole 31 of the locating plate 3, so as to form a movable end A capable of moving in the long hole 31. The movable end A is engaged with a retaining ring 43. The retaining ring 43 has one end which is disposed between two cross rod bodies, and other end which is provided with a pull handle 44 fastened therewith. The pull handle 44 is provided between two sides thereof with a sleeve 441 in which a pin 443 is received. The pin 443 is provided with a spring 442 fitted thereover. The spring 442 is provided at the front end thereof with a pad 444 for urging the inner wall of the sleeve 441. The rod bodies of the suspension arms 4 are provided respectively at the top end thereof with a connection piece 45.

The two suspension arms 4 are provided respectively with a bracing cord 6 for holding the canvas 5.

The pad 444 of the pin 443 of the pull handle 44 compresses the spring 442 or urges the inner wall of the sleeve 441 so as to enable the pin 443 to move away from or retain in the locating hole 21 of the upright post 2. In view of the fact that the pull handle 44 is fastened with the movable end A of the suspension arm 4, the height of the movable end A is fixed when the height of the pull handle 44 is fixed.

Figure 5:
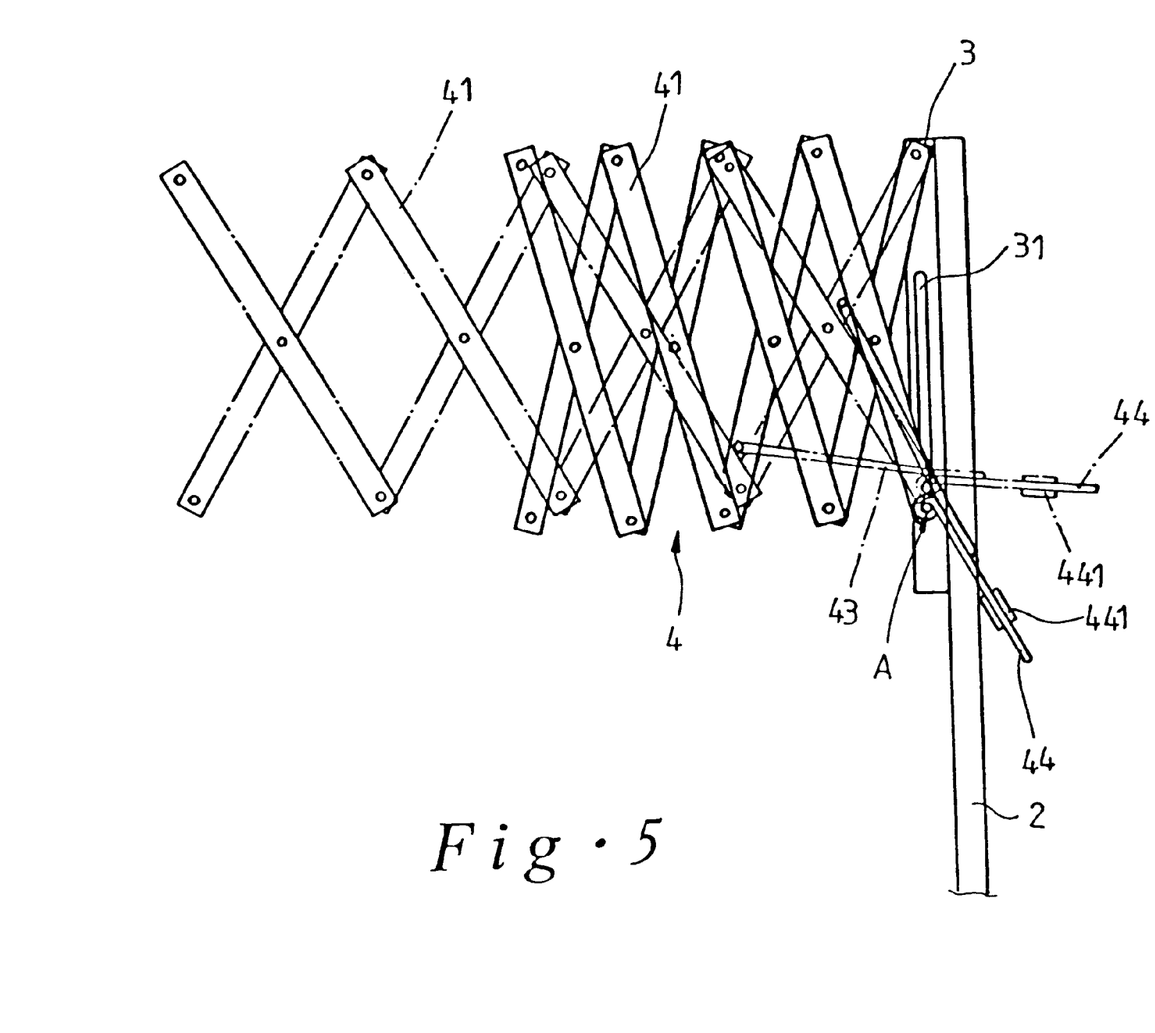
FIG. 5 shows a schematic view of a suspension arm of the present invention in action.
Figure 6:
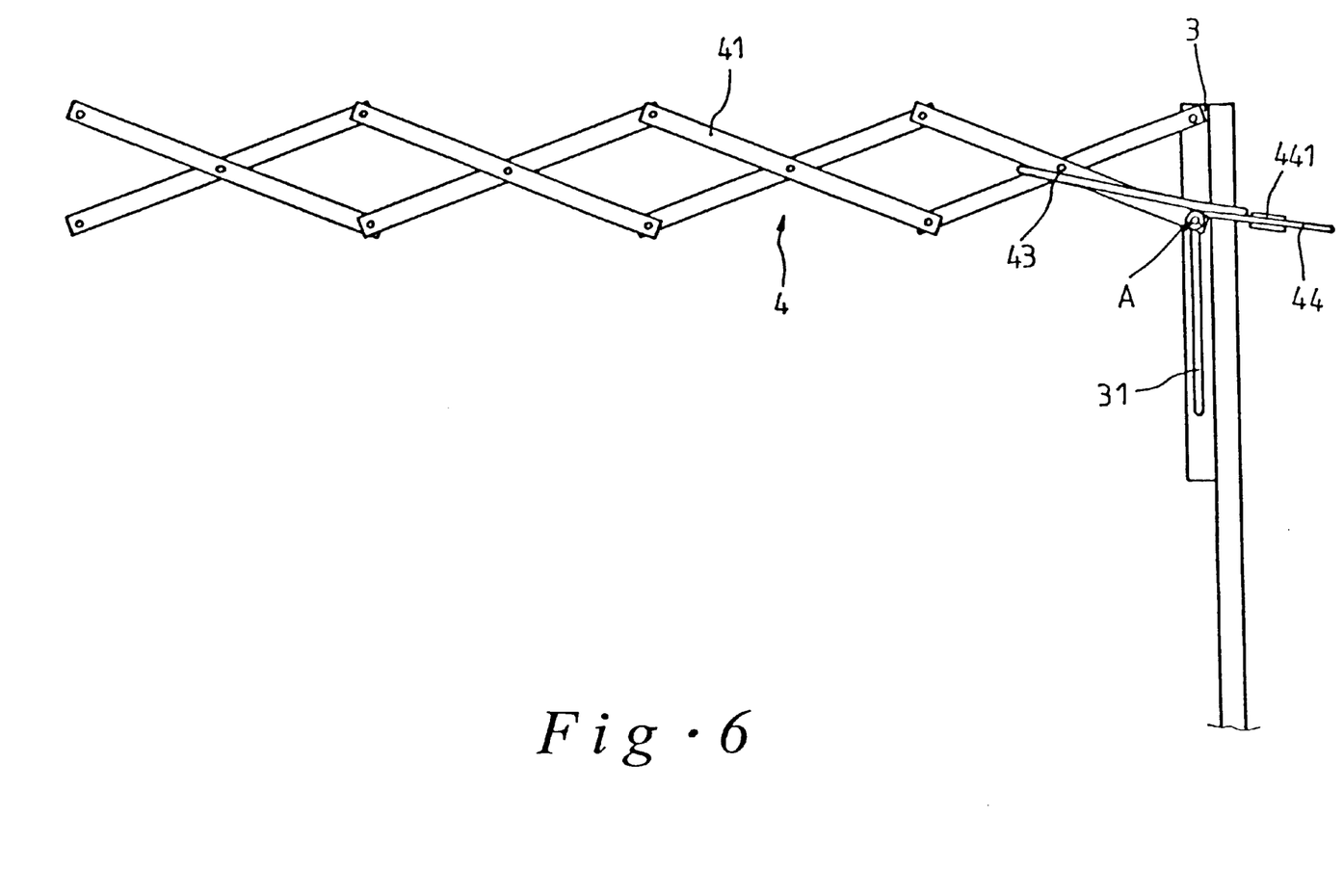
FIG. 6 shows another schematic view of the suspension arm of the present invention in action.

As shown in FIG. 5, the suspension arms 4 are in the folded state. The rod bodies 41 of the suspension arms 4 are actuated to expand outward at the time when the pull handle 44 is pulled to cause the retaining ring 43 to move horizontally until the end of the retaining ring 43 urges the rod bodies 41. When the end of the retaining ring 43 arrives at the pivoting point of two rod bodies 41, the rod bodies 41 are no longer pushed by the retaining ring 43. Now referring to FIG. 6, the movable end A of the suspension arms 4 moves upward in the long hole 31 when the rod bodies 41 are no longer pushed by the retaining ring 43. In light of the parallel crank mechanism, each rod body 41 of the suspension arm 4 is so linked as to move outward. The movable end A of the suspension arm 4 is fixed at an appropriate height by the pin 443 of the pull handle 44,which is retained in one of the locating holes 21. As a result, the extent of the expansion of the suspension arms 4 can be controlled.

Figure 7:
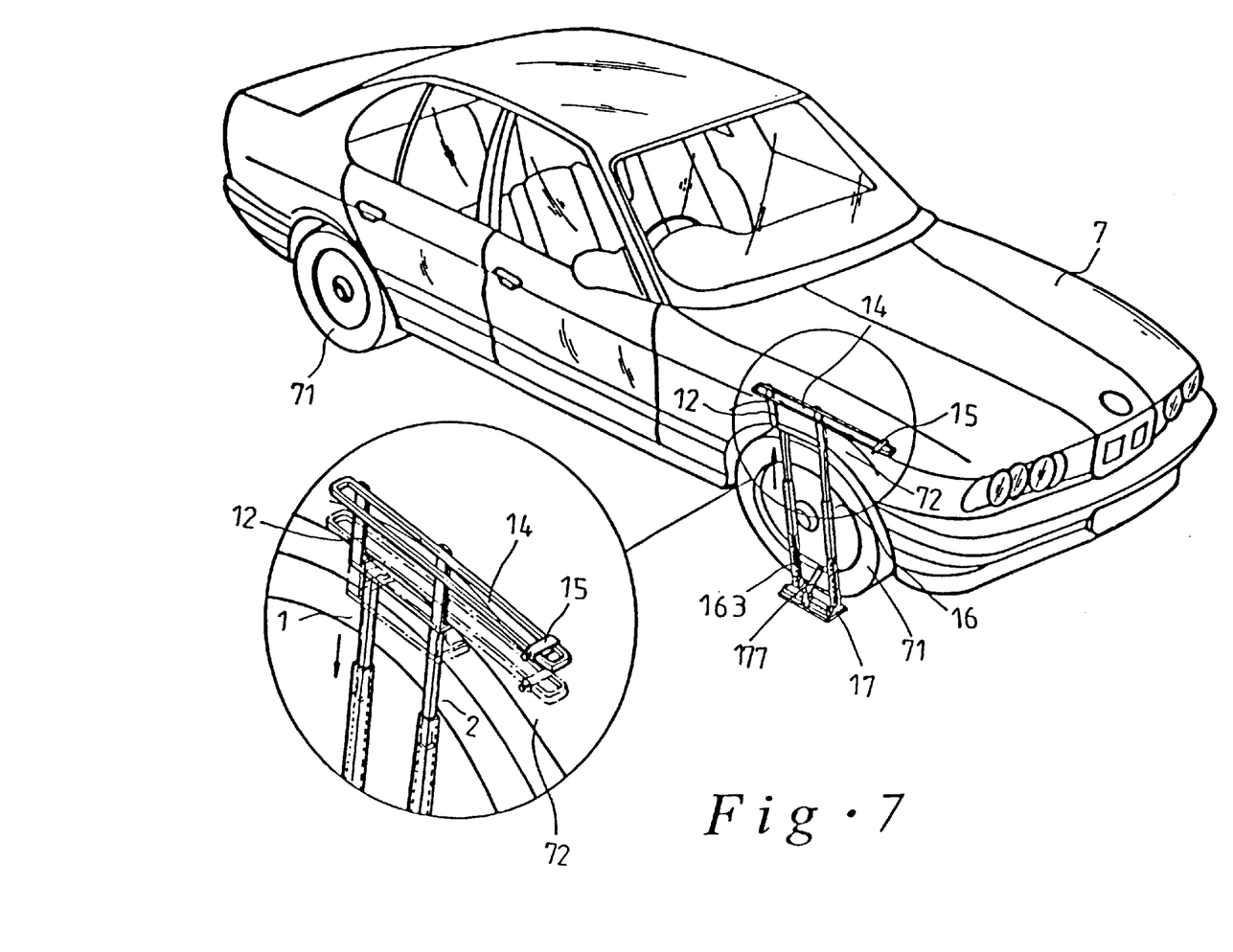
FIG. 7 shows a schematic view of a clamping frame of the present invention at work in conjunction with a motor vehicle.
Figure 8:
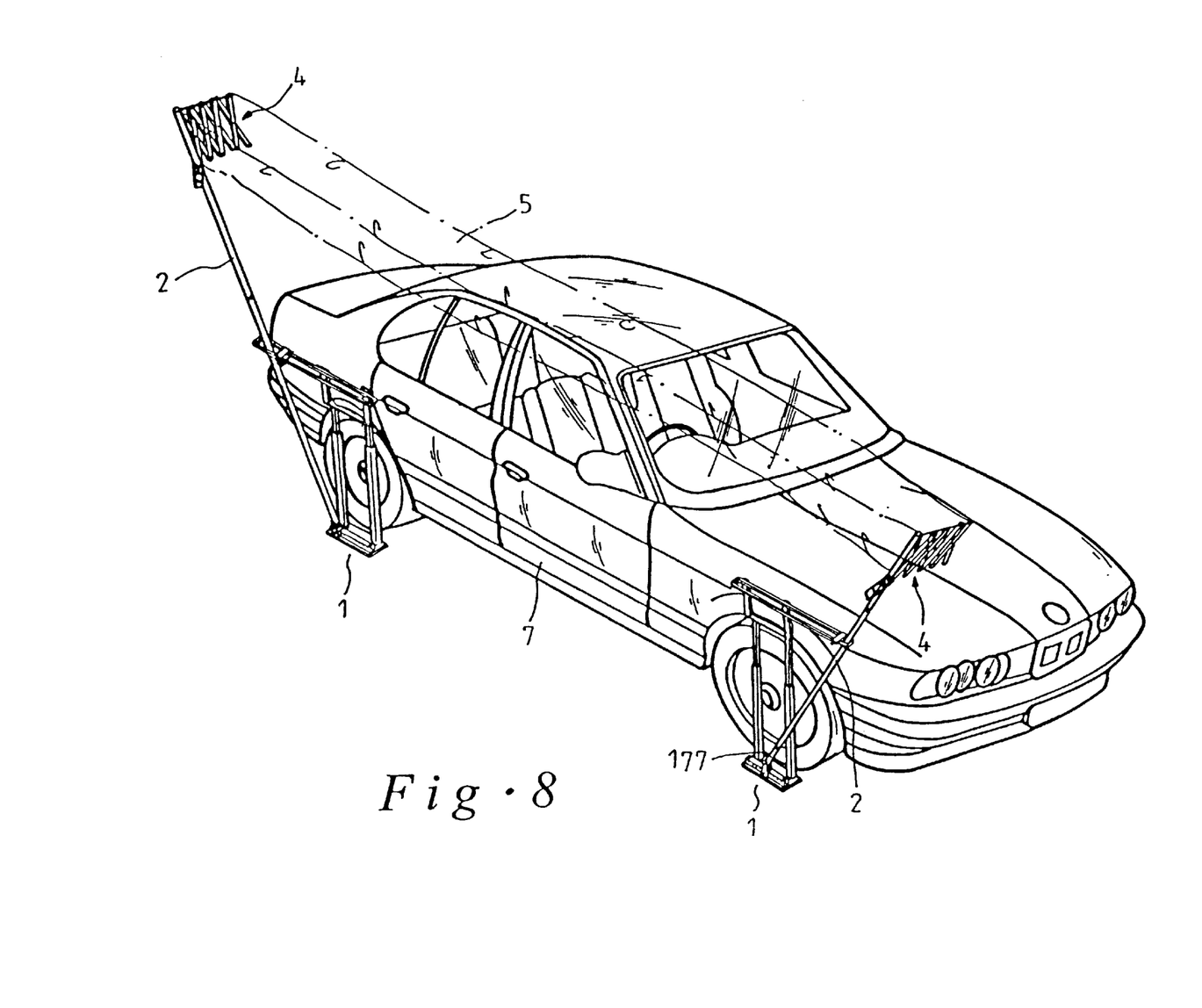
FIG. 8 shows a schematic view of the working relationship between the clamping frame and the upright post of the present invention.

As illustrated in FIG. 7, the clamping seats 12 of the two clamping frames 1 are placed at the front and the rear tires 71 of the same side of a car 7. As the clamping seat 12 is exerted on by an external force, the spring 163 is compressed so as to cause the inner tube 161 to move into the outer tube 162, thereby actuating the clamping seat 12 to move lower. The clamping seat 12 is then placed under the fin plate 72 of the tire 71 of the car 7 before the fin plate 72 is disposed in the clamping seat 12. When the clamping seat 12 is relieved of the external force exerting thereon, the inner tube 161 is actuated by the recovery force of the spring 163 to move back to its original position. The fin plate 72 is urged by the clamping seat 12 such that the fin plate 72 is held securely between the two protective pads 13 of the clamping seat 12. Thereafter, the movable sleeve 177 of the bottom seat 17 of the clamping frame 1 is engaged with the upright post 2 to enable the suspension arm 4 to be located over the roof of the car 7, as shown in FIG. 8.

Figure 9:
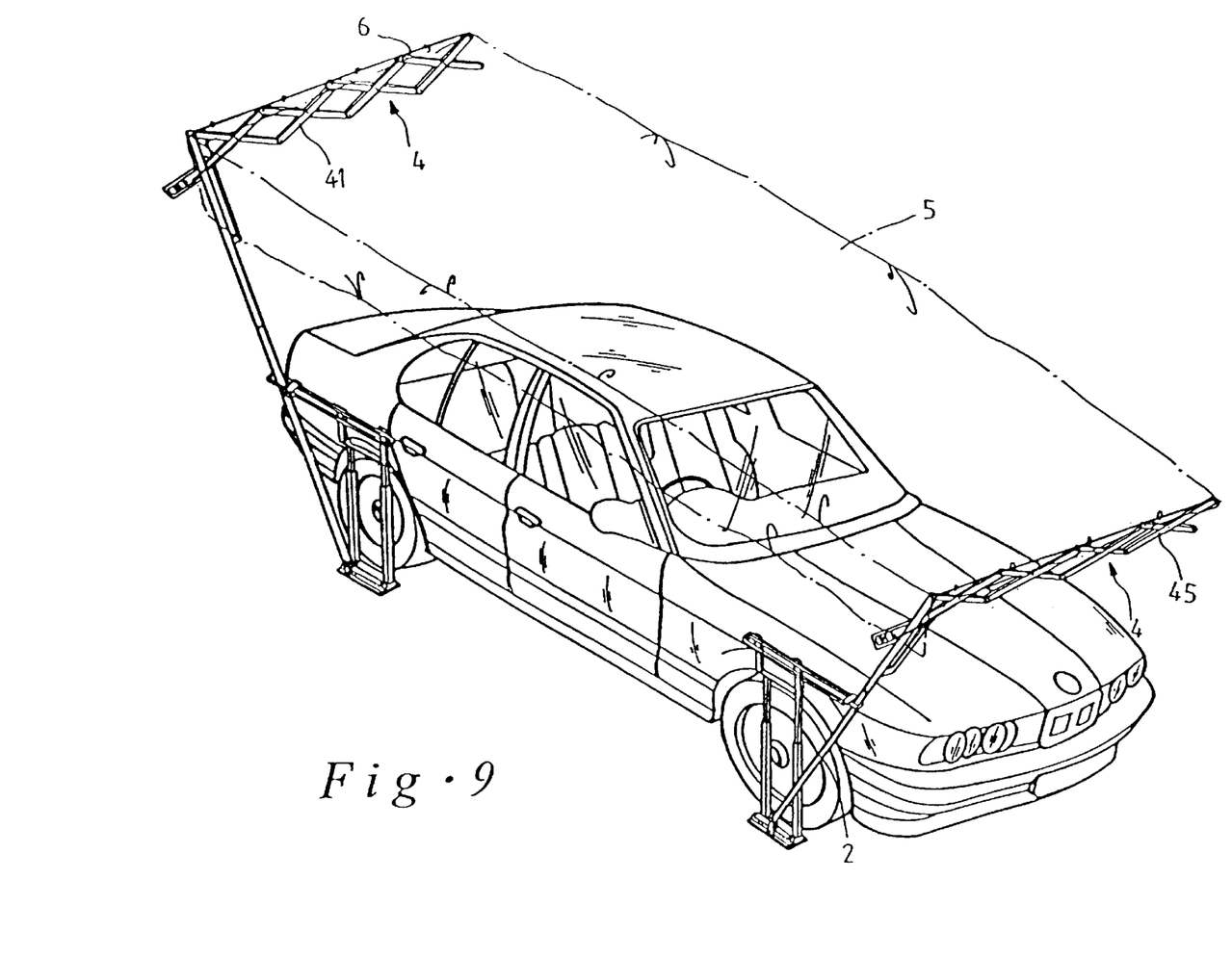
FIG. 9 shows a schematic view of the present invention in one form of use.
Figure 10:
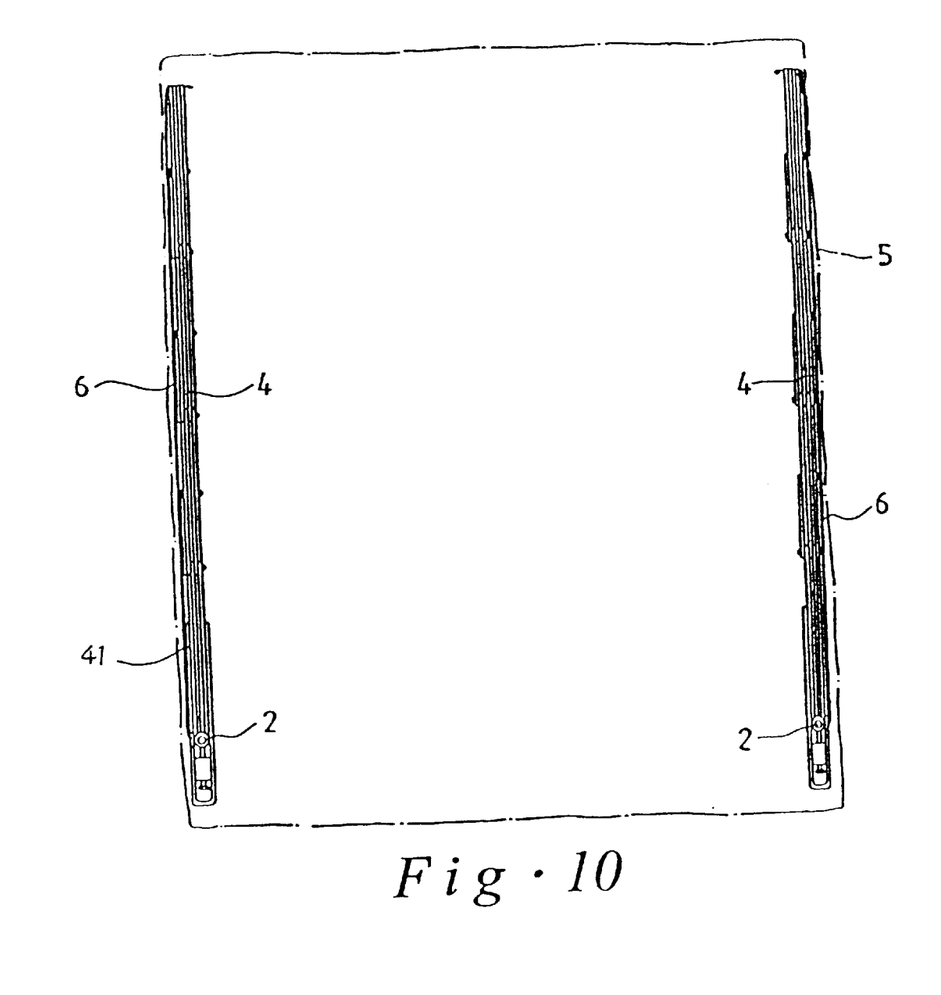
FIG. 10 shows a top plan view of the present invention as shown in FIG. 9.

Now referring to FIG. 9, the canvas 5 is unfolded when the pull handle 44 is pulled to actuate the movable end A of the suspension arm 4 to expand from one side to other side of the car 7. As the canvas 5 is fully unfolded, the canvas 5 is located over the car 7 to protect the car 7 from the solar radiation. The canvas 5 can be folded by retracting the suspension arm 4. As shown in FIG. 10, the two suspension arms 4 are provided therebetween with a bracing cord 6, which is expanded at the time when the suspension arms 4 are expanded. The bracing cord 6 is intended to stretch the canvas 5.

Figure 11:
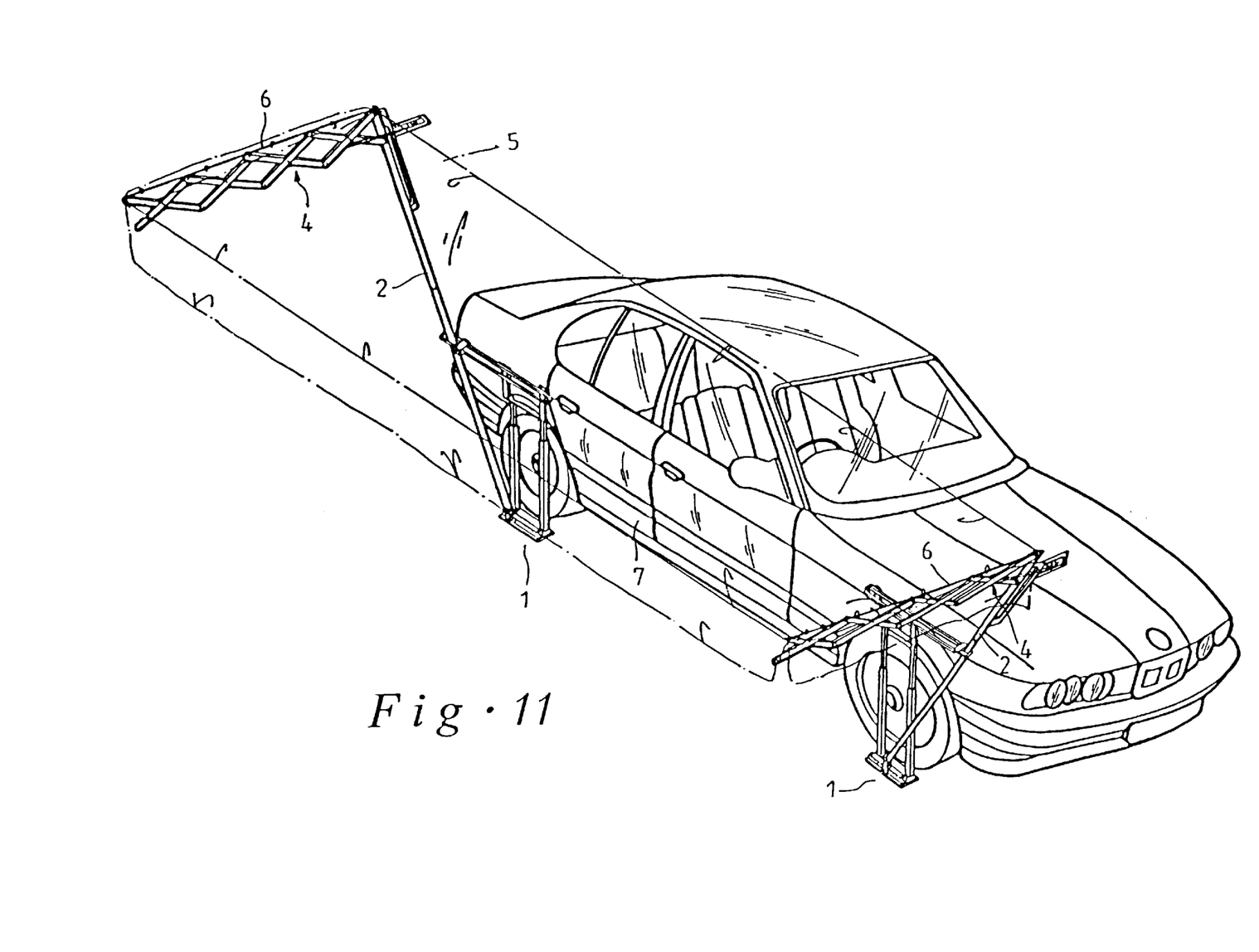
FIG. 11 shows a schematic view of the present invention in other form of use.

As shown in FIG. 11, the recreational shade of the present invention is used in conjunction with the car 7 for the purpose of picnic or other outdoor activities.

The movable sleeve 177 is capable of sliding on the slide block 171 by means of the slide rail 173 of the slide seat 172. In addition, the fastening bolt 18 is received in the locating hole 175 and the adjustment hole 174 of the slide block 171. As a result, if a car has a greater length, the upright post 2 can be moved to locate at an appropriate position by the slide seat 172. In the meantime, the upright post 2 can be located outside the slide slot 14 by the pivoting motion of the movable sleeve 177, so as to enable the canvas 5 to expand fully toward other side of the car 7. The canvas 5 is thus located over the car 7 to provide the car 7 with the protection against the solar rays.

It is therefore readily apparent that the multipurpose recreational shade of the present invention has advantages over the prior art recreational shade. In the first place, the recreational shade of the present invention is detachably fastened with a car. In addition, the canvas of the recreational shade of the present invention can be easily expanded by actuating the suspension arms to expand. Moreover, the recreational shade of the present invention can be adjusted in accordance with the size of a car by relocating the upright post. The recreational shade of the present invention can be thus used to provide the cars of various types and models with the protection against the solar rays. The recreational shade of the present invention is relatively simple in construction and can be thus set up without any hand tool or professional expertise. Unlike the prior art recreational shade, the recreational shade of the present invention is multipurpose.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A multipurpose recreational shade for use in conjunction with a motor vehicle, said shade comprising:

two clamping frames each having a clamping seat engageable with a fin plate located over a tire of the motor vehicle, said clamping seat being fastened with an expandable tube formed of an inner tube and an outer tube such that said clamping seat is actuated by said expandable tube, each of said two clamping frames having a bottom seat which is provided with a movable sleeve;

two upright posts engaged respectively with said movable sleeves of said bottom seat of said clamping frames;

two locating plates fastened respectively with a top end of said upright posts and each being provided respectively with a long hole;

two suspension arms formed of a plurality of rod bodies fastened together pivotally to form a parallel crank mechanism, each said suspension arm being fastened at one end thereof with said locating plate by a fastening bolt which is located in said long hole of said locating plate, so as to form a movable end movable in said long hole of said locating plate; and a canvas fastened with said two suspension arms such that said canvas is actuated by said two suspension arms to fold or unfold.

2. The multipurpose recreational shade as defined in claim 1, wherein said movable end of said suspension arms is fastened with a retaining ring in such a manner that one end of said retaining ring is fastened between two of said rod bodies, and that the other end of said retaining ring is provided with a pull handle fastened therewith.

3. The multipurpose recreational shade as defined in claim 2, wherein said pull handle is provided between two sides thereof with a sleeve, a pin received in said sleeve, and a spring fitted over said pin, said spring provided at one end thereof with a pad fastened therewith such that said pad presses against an inner wall of said sleeve; and wherein said upright posts are provided with a plurality of locating holes for locating said pin.

4. The multipurpose recreational shade as defined in claim 1, wherein said two suspension arms are provided therebetween with a bracing cord fastened therewith such that said bracing cord is attached to said canvas.

5. The multipurpose recreational shade as defined in claim 1, wherein said upright post is an expandable rod.

6. The multipurpose recreational shade as defined in claim 1, wherein said inner tube of said expandable tube is movably received in said outer tube such that said inner tube is fastened at one end thereof with said clamping seat, and that said inner tube is engaged at other end thereof with one end of a spring located in one end of said outer tube.

7. The multipurpose recreational shade as defined in claim 1, wherein said bottom seat of said clamping frames is fastened with one end of said outer tube and is provided with a slide block, a slide seat provided with a slide rail traversing said slide block, said slide seat further provided with a movable sleeve fastened pivotally therewith.

8. The multipurpose recreational shade as defined in claim 7, wherein said slide block of said bottom seat is provided with a plurality of adjustment holes; and wherein said slide seat is provided with a locating hole for locating a fastening bolt.

9. The multipurpose recreational shade as defined in claim 1, wherein said clamping seat of said clamping frames is provided with a plurality of protective pads.

10. The multipurpose recreational shade as defined in claim 1, wherein said clamping seat of said clamping frames is provided in an arresting wall thereof with a slide slot which is provided with an arresting seat slidable in said slide slot.

* * * * *